(12) United States Patent
Fujino (10) Patent No.: US 8,325,915 B2
(45) Date of Patent: Dec. 4, 2012

(54) IMAGE OUTPUT SYSTEM (75) Inventor: Akinobu Fujino, Nara (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 605 days.

(21) Appl. No.: 12/218,657

(22) Filed: Jul. 16, 2008

(65) Prior Publication Data
US 2009/0025065 A1    Jan. 22, 2009

(30) Foreign Application Priority Data

Jul. 18, 2007   (JP) ................................. 2007-186757

(51) Int. Cl.
*H04L 9/00*   (2006.01)
(52) U.S. Cl. ............. 380/51; 726/28; 726/10; 709/225; 358/1; 707/200
(58) Field of Classification Search ...................... 380/51
See application file for complete search history.

(56) References Cited

U.S. PATENT DOCUMENTS

| 6,202,092 | B1 * | 3/2001 | Takimoto ...................... 709/225 |
| 2002/0042884 | A1 * | 4/2002 | Wu et al. ....................... 713/201 |
| 2002/0178272 | A1 | 11/2002 | Igarashi et al. |
| 2004/0196486 | A1 * | 10/2004 | Uchino .......................... 358/1.14 |
| 2005/0168769 | A1 * | 8/2005 | Kim et al. ..................... 358/1.14 |
| 2005/0275867 | A1 * | 12/2005 | Higashiura et al. ........... 358/1.14 |
| 2006/0176509 | A1 * | 8/2006 | Aoki et al. .................... 358/1.15 |
| 2007/0061374 | A1 * | 3/2007 | Inakawa et al. ............... 707/200 |
| 2008/0263675 | A1 * | 10/2008 | McIntyre ......................... 726/28 |

FOREIGN PATENT DOCUMENTS

| CN | 1388459 A | 1/2003 |
| JP | 10-161823 | 6/1998 |
| JP | 2005-339383 | 12/2005 |

* cited by examiner

*Primary Examiner* — Carl Colin
*Assistant Examiner* — S. Ali Zaidi
(74) *Attorney, Agent, or Firm* — Edwards Wildman Palmer LLP; David G. Conlin; Stephen D. LeBarron (57) ABSTRACT

When image data is outputted in a special image processing apparatus which has printed confidential data before, a server confirms whether the user who has instructed output is a permitted user or an unpermitted user. If the user is a permitted user, the server permits printing. If the user is an unpermitted user, the server confirms whether a predetermined period has elapsed after the special image processing apparatus was used last. If the predetermined period has elapsed, the server permits printing. If the predetermined period has not elapsed, the server restricts output by stopping printing or by document filing for storing image data. Thus, by restricting use by an outside user, leakage of confidential data is prevented.

13 Claims, 7 Drawing Sheets

IMAGE OUTPUT SYSTEM

BACKGROUND OF THE INVENTION

1. Field of the Invention

The present invention relates to an image output system for outputting image data while monitoring use of image processing apparatuses by users.

2. Description of the Related Art

An image output system is formed by installing multiple image processing apparatuses in a company or a school and connecting the image processing apparatuses and multiple terminal apparatuses for users via a network. A user operates a terminal apparatus to transmit image data to an image processing apparatus. In response to user instructions through the terminal apparatus, the image processing apparatus prints and outputs the image data.

In an image output system, each image processing apparatus is managed by a server to restrict the number of prints for each user, for example, as described in Japanese Patent Laid-Open No. 2005-339383.

In an image output system, not only inside users such as users inside a company but also outside users such as users outside the company use image processing apparatuses. By the outside users using image processing apparatuses, the number of prints of the entire system increases. Image data outputted from image processing apparatuses include confidential data such as a document for internal use only. When an outside user uses an image processing apparatus, an opportunity occurs that the outside user comes into contact with confidential data. This causes leakage of the confidential data, and it is undesirable from the viewpoint of security.

In view of the above situation, the object of the present invention is to provide an image output system capable of suppressing increase in the number of prints as well as preventing leakage of confidential data by restricting use by outside users.

SUMMARY OF THE INVENTION

In the present invention, image processing apparatuses which output image data and a server which manages use history of the image processing apparatuses are communicably connected; and the server registers an image processing apparatus which has outputted confidential data as a special image processing apparatus, and, when image data is to be outputted from the special image processing apparatus in response to a user instruction, restricts output according to the user.

The server monitors what image data the image processing apparatuses output with use history. Users who instruct output of image data include users who have been registered in advance and users who are not registered. The users who have been registered in advance are regarded as permitted users and the users who are not registered are regarded as unpermitted users. The permitted users can output confidential data. The unpermitted users cannot output confidential data. Therefore, when image data is outputted from a special image processing apparatus, the server judges the user who has instructed output. If the user is an unpermitted user, the server restricts output. If the user is a permitted user, output is permitted. By restricting output, the opportunity of an unpermitted user touching confidential data on the special image processing apparatus is reduced.

When output of image data is restricted, the image processing apparatus prohibits output of image data, or suspends output of image data and stores the image data. Then, the server notifies a permitted user that output of image data is suspended. When the permitted user who has received the notification instructs output, the server permits output, and the image processing apparatus outputs the image data.

When restricting output of image data, the server outputs a warning to a user. When an unpermitted user gives an instruction, the warning is outputted. By a permitted user giving an instruction instead of the unpermitted user, image data can be outputted.

When restricting output of image data, the server gives the user information calling his attention and presents image data output methods to him. By giving such information to the permitted user, the permitted user can select an output method and output image data in an appropriate method.

Alternatively, the server informs the user of an image processing apparatus which does not output confidential data. That is, an image processing apparatus other than the special image processing apparatus is informed. The unpermitted user is permitted to perform output from this image processing apparatus.

When output of image data is restricted, the image processing apparatus stores the image data. When an instruction by the permitted user is inputted, the image processing apparatus outputs the image data.

As described above, by restricting output and by taking a measure according to the restriction, it is possible to prevent an unpermitted user from using a special image processing apparatus and reduce the opportunity of touching confidential data.

After a predetermined time elapsed since a special image processing apparatus was used, the server releases registration of the special image processing apparatus. There is a possibility that confidential data remains in the special image processing apparatus until the predetermined time elapses. However, after the predetermined time elapsed, the possibility disappears, and therefore, it does not matter even if an unpermitted user uses the image processing apparatus. Therefore, when an unpermitted user instructs output of image data from the image processing apparatus the registration of which has been released, the server permits output of image data other than confidential data.

A terminal apparatus for a user is provided so that it can communicate with the server and the image processing apparatuses, and the user instructs output of image data via the terminal apparatus. The terminal apparatus gives an instruction to an image processing apparatus via the server. Meanwhile, the server makes judgment about restriction of output.

When the user instructs viewing of image data via the terminal apparatus, the server prohibits viewing if the user is an unpermitted user. By displaying the image data on the terminal apparatus, the user can view the image data. Viewing is also output of the image data, the server restricts viewing according to users.

According to the present invention, by restricting output according to users when image data is outputted from an image processing apparatus used by unspecified users, it is possible to reduce the opportunity of an unpermitted user such as an outside user touching confidential data. Thereby, it is possible to prevent leakage of confidential data and construct a high-security image output system.

DETAILED DESCRIPTION OF THE PREFERRED EMBODIMENTS

Figure 1:
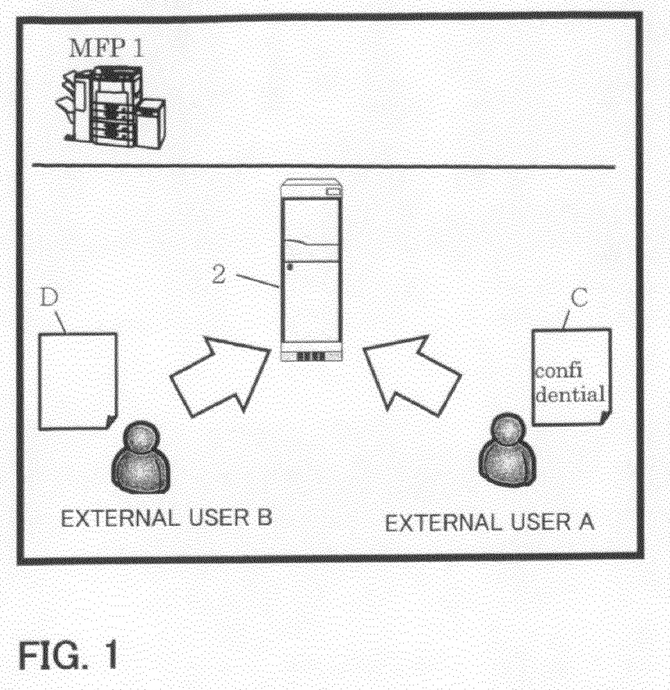
FIG. 1 is a diagram for illustrating a form of use by users in an image output system of the present invention.
Figure 2:
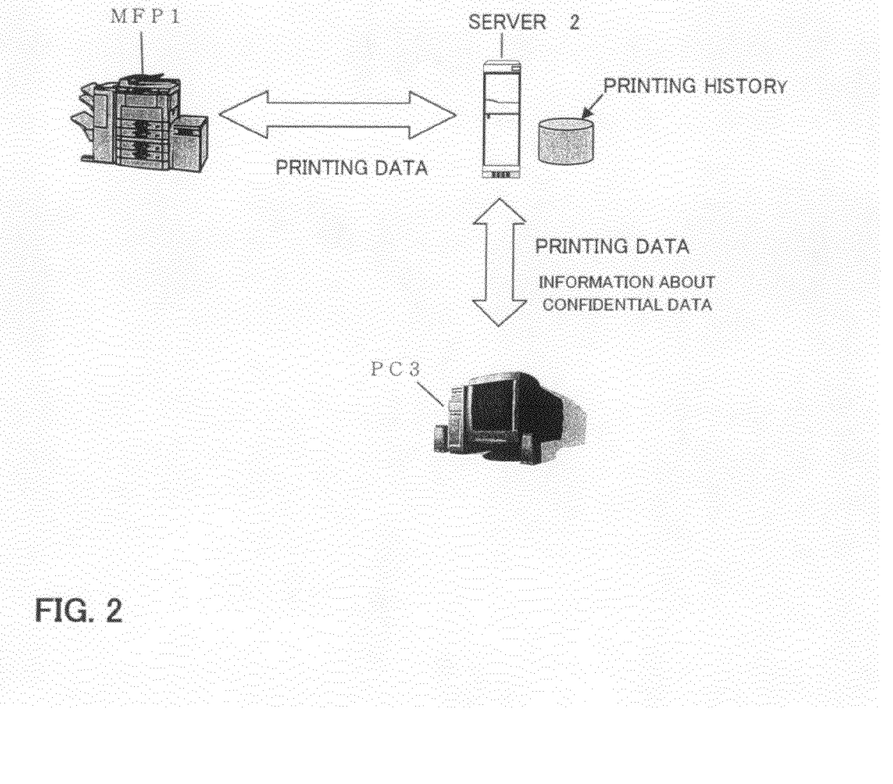
FIG. 2 is a diagram showing the flow of data in the image output system.

FIGS. 1 and 2 show an image output system of this embodiment. This system is configured by multiple image processing apparatuses 1 which output image data, a server 2 which manages each of the image processing apparatuses 1, and multiple terminal apparatuses 3 for instructing output of image data which are connected to one another through a network.

This image output system is formed in a place where an unspecified large number of users can get into, such as a company, a school and a government office. The image processing apparatuses 1 are MFPs (Multi-Function Printers) having copying, printing, scanning, facsimile communication and document filing functions. The server 2 and the terminal apparatuses 3 are computers. Especially the terminal apparatuses 3 are personal computers. The network includes a LAN, a WAN, the Internet or the like.

The image processing apparatuses 1 include those used only by inside users, such as an internal user A, and those used not only by inside users but also by outside users, such as an external user B. Image data outputted from the image processing apparatuses 1 also include confidential data. A document C for internal use only and the like are confidential data, and the confidential data must not be disclosed to the outside users. As for an ordinary document D on which ordinary image data is printed, it does not matter even if it is disclosed to the outside users.

An inside user is regarded as a permitted user registered with the server 2 in advance. A permitted user is permitted to output and view all image data including confidential data. An outside user is regarded as an unpermitted user who is not registered with the server 2. In the case of an unpermitted user, output of confidential data is restricted. That is, printing of confidential data from the image processing apparatuses 1 and viewing of confidential data on the terminal apparatuses 3 are restricted. However, an unpermitted user can output ordinary image data.

Figure 3:
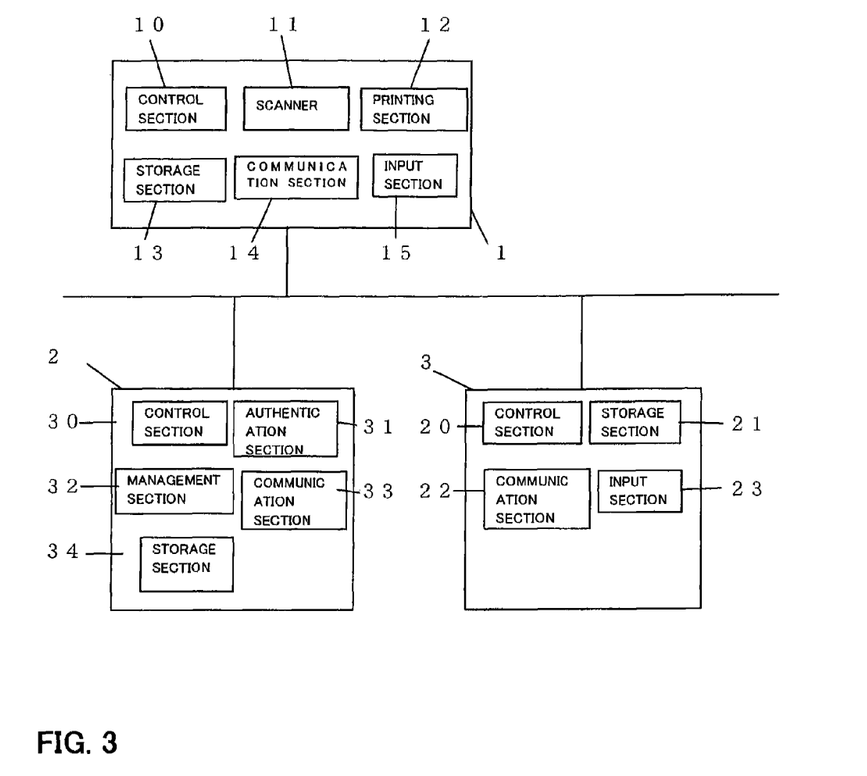
FIG. 3 is a schematic block diagram of an image processing apparatus, a server and a terminal apparatus.

As shown in FIG. 3, the image processing apparatus 1 is provided with a control section 10, a scanner 11, a printing section 12, a storage section 13, a communication section 14 and an input section 15. The scanner 11 reads an image on a document and inputs image data. The printing section 12 prints the inputted image data on a recording sheet. The storage section 13 is a hard disk apparatus or a rewritable semiconductor memory, and it stores image data. The communication section 14 communicates with the server 2, the terminal apparatuses 3, the other image processing apparatuses 1 via the network. The communication section 14 also performs facsimile communication with outside image processing apparatuses 1 via a telephone line. The input section 15 has an operation key and a touch panel and receives a user operation. The control section 10 controls output of image data on the basis of a user instruction from the input section 15 or the terminal apparatus 3 and an instruction of the server 2. The input section 15 inputs authentication information about a user. The authentication information is a user ID, a password, and biometric information such as a fingerprint or the like.

Here, output of image data in the image processing apparatuses 1 includes printing of image data to generate copies or prints, transmission of image data by facsimile communication, transmission of image data by data communication, and document filing for writing image data in the storage section 13. Displaying image data on the terminal apparatus 3 is also regarded as output of image data, and a user can view the image data.

The terminal apparatuses 3 is provided with a control section 20, a storage section 21 configured by a hard disk apparatus, a communication section 22 which communicates with the server 2 or the image processing apparatuses 1 via the network, and an input section 23 such as a keyboard. The control section 20 causes application software to create image data. The image data is stored in the storage section 21 or outputted to the image processing apparatus 1 or the server 2 by the communication section 22. The input section 23 inputs authentication information such as a password and biometric information.

The server 2 is provided with a control section 30, an authentication section 31, a management section 32 and a communication section 33. The authentication section 31 checks authentication information about a user inputted from a terminal apparatus 3 or an image processing apparatus 1 to judge whether the user is a permitted user or an unpermitted user. Authentication information about permitted users are managed by the management section 32. The management section 32 manages a storage section 34 such as a hard disk apparatus and stores the authentication information. The management section 32 also stores various setting information and registration information. The communication section 33 communicates with the terminal apparatuses 3 and the image processing apparatuses 1 via the network.

The server 2 manages use history of the image processing apparatuses 1. When the image processing apparatus 1 outputs image data, the image processing apparatus 1 transmits output information about the output to the server 2. When output is instructed from a terminal apparatus 3, the terminal apparatus 3 transmits output information to the server 2. The control section 30 creates use history on the basis of the output information, and the management section 32 stores it in a storage section 34. The use history includes the user who instructed the output, the terminal apparatus 3 used, the image processing apparatus 1 which performed output, the contents of the output, output time, presence or absence of confidential data, and the like.

The server 2 identifies an image processing apparatus 1 which outputted confidential data on the basis of the use history. The control section 30 registers this image processing apparatus 1 with the management section 32 as a special image processing apparatus 1. Information about the special image processing apparatus 1 is stored in the storage section 34.

Here, the server 2 monitors the use of the image processing apparatuses 1 by users and restricts output of image data according to users for each image processing apparatus 1 in order to reduce the opportunity of an unpermitted user coming into contact with confidential data. That is, when image data is outputted from a special image processing apparatuses 1, the control section 30 judges whether or not to restrict output according to the user who has instructed the output. If the user is a permitted user, the control section 30 permits output of image data. If the user is an unpermitted user, the control section 30 restricts output. When an unpermitted user instructs output of image data from an image processing apparatus 1 other than the special image processing apparatus 1, the control section 30 prohibits output if it is output of confidential data and permits output if it is output of ordinary image data.

Figure 4:
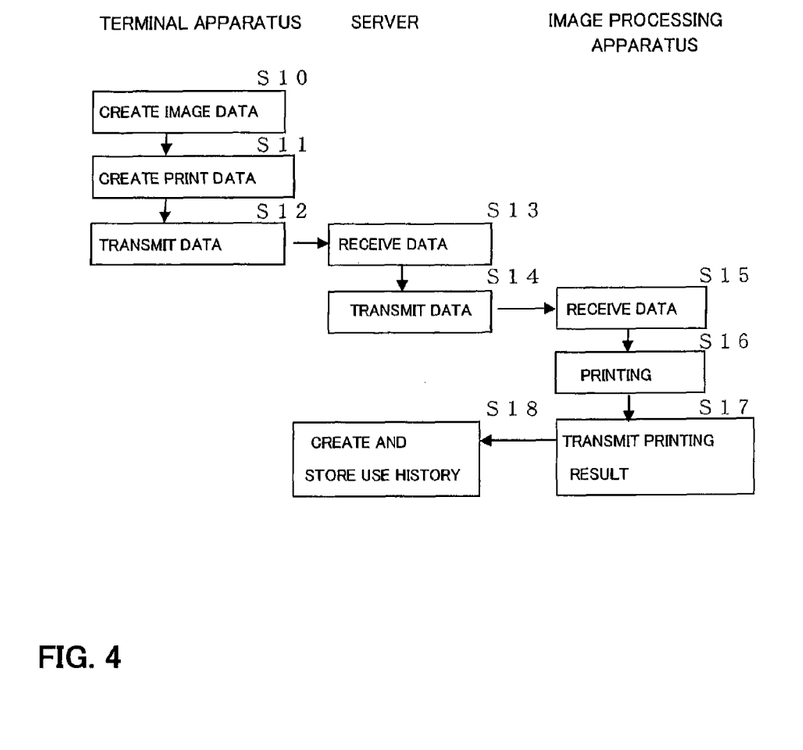
FIG. 4 is a flowchart for printing image data.

The operation performed when image data is outputted will be described with reference to FIG. 4. Here, printing is performed on an image processing apparatus 1 with the use of a terminal apparatus 3. On the terminal apparatus 3, the control section 20 creates image data in response to a user operation (S10), or it reads image data from the storage section 21. At the same time, it creates instruction information for performing output. It does not matter whether the user is a permitted user or an unpermitted user. The image data is ordinary image data. The control section 20 causes a printer driver to operate, and converts the image data and creates print data (S11). The instruction information is included in the print data. The communication section 22 transmits the print data to the server 2 (S12).

When the server 2 receives the print data (S13), the control section 30 confirms that the image data to be outputted is ordinary data on the basis of the instruction information. The communication section 33 transfers the print data to the image processing apparatus 1 (S14).

When the image processing apparatus 1 receives the print data (S15), the control section 10 converts the print data to image data. The printing section 12 performs image processing of the image data and prints the image data (S16). The control section 10 notifies the printing result to the server 2 via the communication section 14 (S17).

When the server 2 receives the printing result, the control section 30 creates use history on the basis of the printing result, and the management section 32 stores the use history in the storage section 34 (S18).

Though the terminal apparatus 3 has transmitted the image data to the image processing apparatus 1 via the server 2, it may transmit the image data directly to the image processing apparatus 1. However, the instruction information is transmitted to the server 2.

Figure 5:
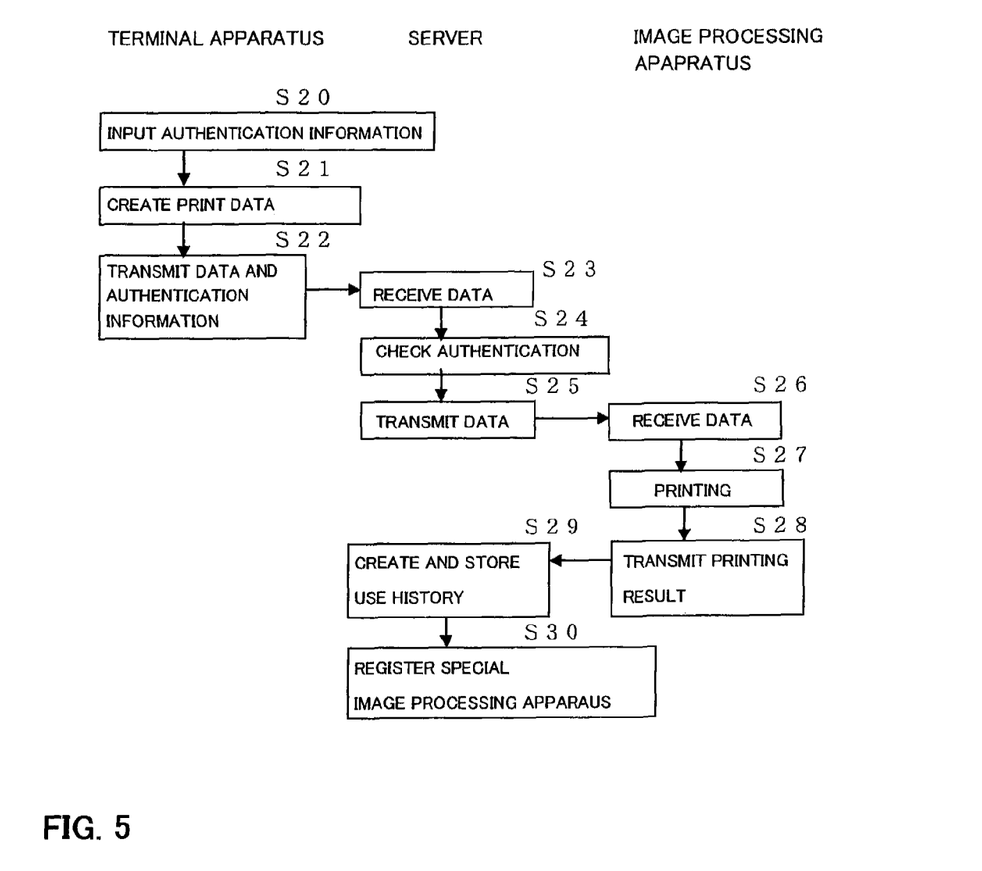
FIG. 5 is a flowchart for printing confidential data.

As shown in FIG. 5, when a permitted user prints confidential data, the control section 20 displays a request for input of authentication to the user on the terminal apparatus 3. The user inputs authentication information from the input section 23 (S20). The control section 20 creates print data of image data specified by a user operation (S21) and transmits it to the server 2 together with the authentication information (S22). This image data is confidential data. Special information indicating that the image data is confidential is added to the image data, or information indicating that the image data is confidential is included in the instruction information. Thereby, it is possible to identify the image data as confidential data.

When the server 2 receives the print data and the authentication information (S23), the authentication section 31 checks the authentication information with the authentication information registered with the management section 32. The authentication section 31 judges that the user is a permitted user (S24). When the user is an unpermitted user, the user's authentication information is not registered. Therefore, the authentication section 31 does not authenticate the user. The control section 30 recognizes that the permitted user instructed output of confidential data and permits the output. Then, the control section 30 outputs print data to a specified image processing apparatus 1 (S25).

When the image processing apparatus 1 receives the print data (S26), the control section 10 outputs image data to the printing section 12 on the basis of the permission of output.

The printing section 12 prints the image data (S27). The control section 10 notifies the printing result to the server 2 through the communication section 14 (S28).

When the server 2 receives the printing result, the control section 30 creates use history on the basis of the printing result, and the management section 32 stores the use history in the storage section 34 (S29). In this case, since the image processing apparatus 1 has outputted the confidential data, the management section 32 registers the image processing apparatuses 1 concerned as a special image processing apparatuses 1 (S30).

Figure 6:
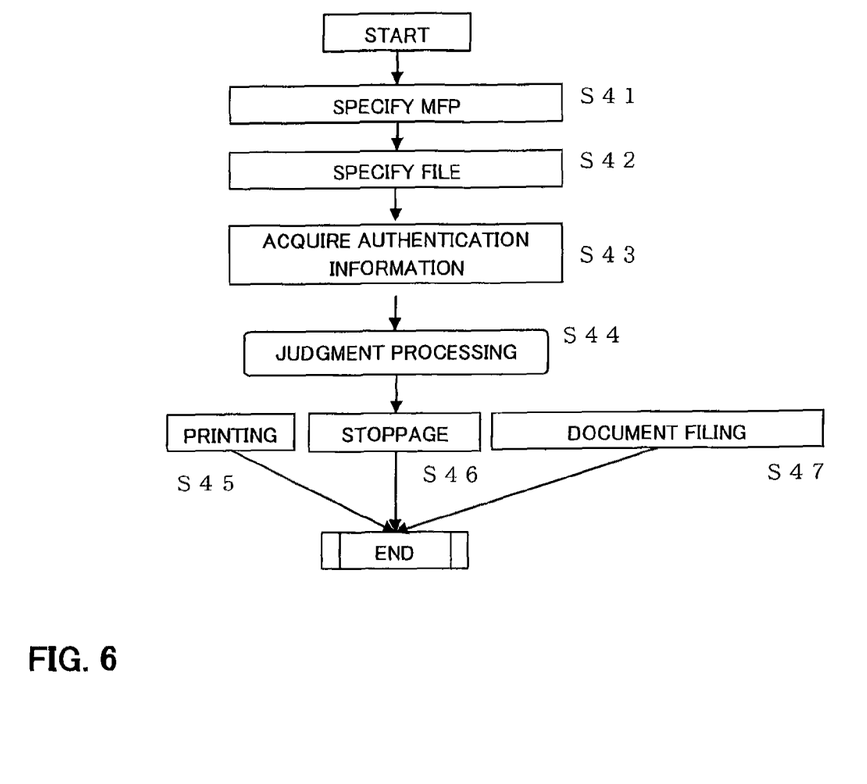
FIG. 6 is a flowchart for performing output from a special image processing apparatus.

Next, description will be made on a case where an unidentified user outputs image data on a special image processing apparatus 1. As shown in FIG. 6, in a terminal apparatus 3, the control section 20 specifies an image processing apparatus 1 to perform output (S41) and specifies a file of image data to be outputted (S42) on the basis of a user input. The control section 20 acquires user authentication information (S43). Then, the control section 20 outputs print data to the server 2 similarly as described above.

Figure 7:
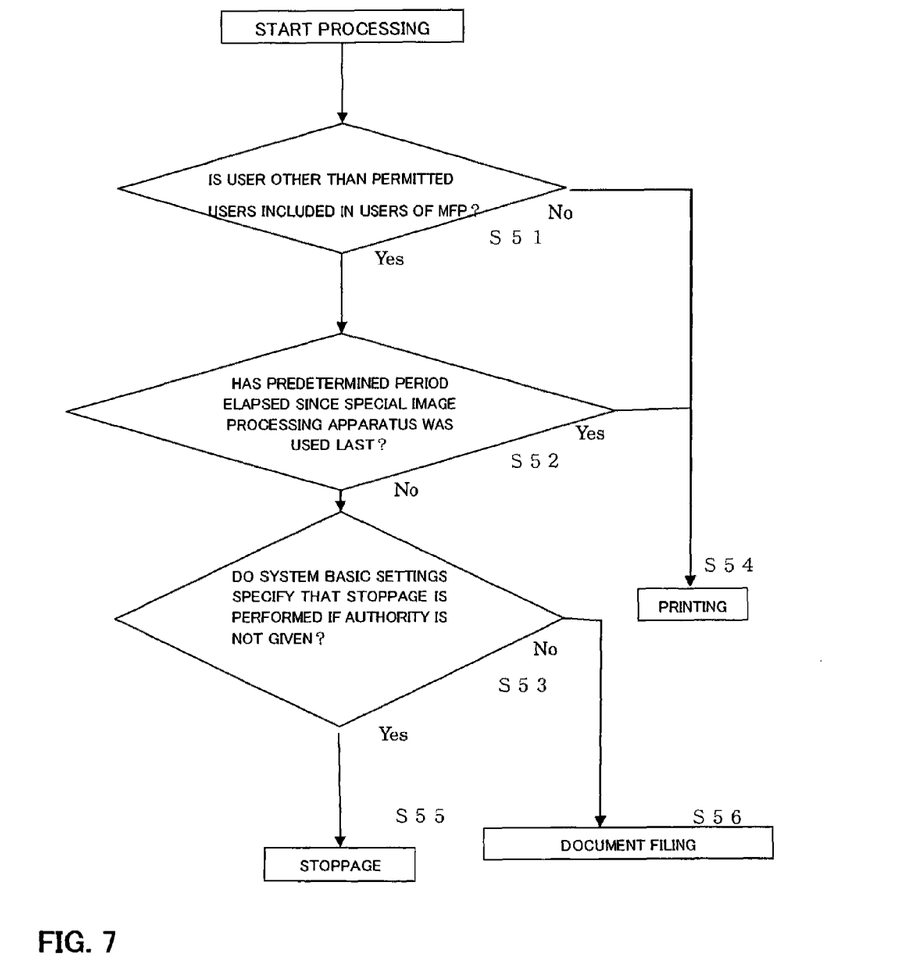
FIG. 7 is a flowchart of output restriction judgment processing.

In the server 2, the control section 30 judges whether or not to restrict output on the basis of the information inputted from the terminal apparatus 3 (S44). As the judgment processing, it is first confirmed whether a user other than permitted users is included in users who use the image processing apparatus 1 (S51) as shown in FIG. 7. When the such a user is not included, that is, only permitted users use the image processing apparatus 1, the control section 30 permits output and enables printing (S54). In this case, since an unpermitted user does not use the special image processing apparatus 1, there is not a possibility of an unpermitted user coming into contact with confidential data even if the confidential data is outputted.

When a user other than permitted users is included, that is, an unpermitted user also uses the image processing apparatus 1, the control section 30 confirms whether a predetermined period has elapsed since a user used the special image processing apparatus 1 last (S52). The control section 30 calculates the time elapsed after the last use until the use this time, on the basis of the use history of the special image processing apparatus 1, and judges whether the predetermined period, for example, one day has elapsed. When the predetermined period elapsed, the control section 30 releases registration of the special image processing apparatus 1. The specified image processing apparatus 1 becomes an ordinary image processing apparatus 1. In this case, output of image data except confidential data is permitted and printing thereof is enabled, irrespective of whether the user is a permitted or unpermitted user (S54).

When the predetermined period does not elapsed, there is a possibility that a printed matter of outputted confidential data remains in the image processing apparatus 1. Therefore, the control section 30 restricts output from the special image processing apparatus 1 by an unpermitted user. In the case of a permitted user, output of image data is permitted.

When restricting output, the control section 30 selects whether to stop output or to perform document filing for suspending output and storing the image data in the storage section 34 (S53). This selection is based on system basic settings. If it is set that output is stopped without administrator authority, then output is stopped (S55). If it is not set, document filing is performed (S56).

During the above judgment processing, the server 2 informs the processing state to the terminal apparatus 3 used by the user. The terminal apparatus 3 displays the state. The user can recognize the result of the output instruction and take a measure according to the state.

The control section 30 outputs the result of the above judgment to the image processing apparatus 1. The image processing apparatus 1 executes any of printing (S45), stoppage (S45) and document filing (S47) on the basis of the judgment result. In the case of stoppage, the control section 30 does not transmit image data to the image processing apparatus 1 and deletes the image data from the storage section 34. In the case of document filing, the control section 30 transmits the image data to the image processing apparatus 1. The image processing apparatus 1 stores the received image data in the storage section 13. The output result is notified to the server 2. In the server 2, use history is created and stored in the storage section 34.

Thus, when an unpermitted user attempts to output image data on a special image processing apparatus 1, the output is restricted. Consequently, since printing of image data is prohibited, increase in the number of prints can be suppressed. Furthermore, since the opportunity of an unpermitted user touching confidential data can be eliminated, leakage of confidential data can be prevented, and the security can be enhanced.

There may be a case where it is inconvenient to restrict output because an unpermitted user has given an instruction. For example, there may be a case of use by an unpermitted user who has been asked by a permitted user. Therefore, as a measure to take for such a case, the control section 30 of the server 2 notifies a terminal apparatus 3 used by the permitted user that image data is being suspended, when performing document filing of the image data. When the permitted user permits the output, the terminal apparatus 3 notifies permission to the server 2. The server 2 outputs an output permission instruction to the image processing apparatus 1. The image processing apparatus 1 prints and outputs the image data on the basis of this instruction.

As another measure, the server 2 outputs a warning to the terminal apparatus 3 of the user who has given the instruction when restricting output of image data. In place of the unpermitted user who was given the warning, the permitted user instructs output of the image data from the terminal apparatus 3. The server 2 permits the output, and the image processing apparatus 1 prints and outputs the image data. If the output instruction is not given from the permitted user, the server 2 stops output.

Furthermore, when restricting output of image data, the server 2 informs the permitted user's terminal apparatus 3 that output is restricted to call his attention. Then, the server 2 presents output methods on the permitted user's terminal apparatus 3. That is, the server 2 presents a method of immediately outputting the image data from the special image processing apparatus 1, a method of transferring the image data to another image processing apparatus 1 to output the image data, a method of performing document filing once and performing output in response to the permitted user performing an operation on the image processing apparatus 1 concerned, and then causes the permitted user to select any of the methods. The server 2 gives an instruction to the image processing apparatus 1 in accordance with the selected method. The image processing apparatus 1 prints and outputs the image data in the method in accordance with the instruction.

Alternatively, the server 2 informs unregistered image processing apparatuses 1 other than the special image processing apparatus 1 to the terminal apparatus 3 of the user who has given the instruction. These image processing apparatuses 1 do not output confidential data. Therefore, image data can be outputted from the image processing apparatuses 1 in response to an instruction by the unpermitted user. The unpermitted user specifies a desired image processing apparatus 1.

The server 2 transmits the image data to the specified image processing apparatus 1 and instructs output. The specified image processing apparatus 1 prints and outputs the image data.

As another measure, when restricting output of image data, the server 2 instructs security printing. The image processing apparatus 1 stores the image data in the storage section 13. Then, when authentication information about the permitted user is inputted from the input section 15 of the image processing apparatus 1, the control section 10 reads image data from the storage section 13, and the printing section 12 prints and outputs the image data.

The present invention is not limited to the embodiment described above. It goes without saying that a lot of modifications and changes can be made in the above embodiment within the scope of the present invention. As output of image data, image data stored in an image processing apparatus or a terminal apparatus is displayed on the terminal apparatus. A user can view the image data on the terminal apparatus. However, when an unpermitted user instructs viewing, the server prohibits viewing of image data stored in a special image processing apparatus.

In the case where a user directly uses an image processing apparatus as in the case of copying or outputting image data stored in the storage section, on the image processing apparatus, the server restricts output according to users similarly to the above embodiment.

As restriction of output of image data, facsimile communication or data communication may be restricted. In this case, stoppage of communication or document filing is performed. Document filing may be restricted. In this case, document filing is stopped.

One image processing apparatus among multiple image processing apparatuses is set as a master machine. The master machine may function as a server.

What is claimed is:
1. An image output system comprising:
a plurality of image processing apparatuses which output image data; and
a server which is communicably connected to the image processing apparatus,
creates, based on the output information transmitted from the image processing apparatus at a time when each image processing apparatus outputs image data, a use history including the presence or absence of data of the image processing apparatuses,
manages the created use history, and the server, based on the use history that an image processing apparatus which is not a special image processing apparatus outputs confidential data in response to the instructions by a permitted user, registers the image processing apparatus which has outputted confidential data as a special image processing apparatus, and
when image data is to be outputted from the special image processing apparatus in response to a user instruction, restricts output of both confidential data and non-confidential data from the special image processing apparatus when an unpermitted user gives instructions, and permits output of both confidential data and non-confidential data from special image processing apparatus when a permitted user gives an instruction,
wherein, when at least a predetermined time has elapsed after the special image processing apparatus is used, the server releases registration of the special image processing apparatus and allows output of image data, except confidential data, from the released imaging processing apparatus, and when the predetermined period has not elapsed, restricting output from the special image processing apparatus by the unpermitted user and outputting the image data for a permitted user.

2. The image output system according to claim 1, wherein the server regards a user registered in advance as the permitted user and an unregistered user as the unpermitted user, and permits output of image data in the case of the permitted user and restricts output of image data in the case of the unpermitted user.

3. The image output system according to claim 2, wherein, when output of the image data is restricted, the image processing apparatus prohibits output of image data.

4. The image output system according to claim 2, wherein, when output of the image data is restricted, the image processing apparatus suspends output of the image data and stores the image data.

5. The image output system according to claim 4, wherein the server notifies the permitted user that output of the image data is suspended.

6. The image output system according to claim 2, wherein the server outputs a warning to the unpermitted user when restricting output of image data.

7. The image output system according to claim 2, wherein the server gives an user information calling the user's attention and presents an image data output method to the user when restricting output of the image data.

8. The image output system according to claim 2, wherein when restricting output of the image data the server informs the unpermitted user which image processing apparatus does not output confidential data.

9. The image output system according to claim 2, wherein the image processing apparatus stores the image data when output of the image data is restricted, and outputs the image data when an instruction by a permitted user is inputted.

10. The image output system according to claim 1, wherein the server permits output of image data other than the confidential data when the unpermitted user instructs output of image data from the image processing apparatus which has been released from registration.

11. The image output system according to claim 10, wherein a terminal apparatus for the permitted user or the unpermitted user is provided to communicate with the server and the image processing apparatuses, and the permitted user or unpermitted user instructs output of image data through the terminal apparatus.

12. The image output system according to claim 1, wherein a terminal apparatus for a user is provided to communicate with the server and the image processing apparatuses, and, when the user instructs viewing of image data through the terminal apparatus, the server prohibits viewing if the user is an unpermitted user.

13. An image output system comprising image processing apparatuses which output image data; and a server which is communicably connected to the image processing apparatus and manages use history including the presence or absence of confidential data of the image processing apparatuses, wherein:

the server, based on the use history that an image processing apparatus which is not a special image processing apparatus outputs confidential data in response to the instructions by a permitted user, registers the image processing apparatus which has outputted confidential data as a special image processing apparatus;

the server, when image data is to be outputted from the special image processing apparatus in response to a user instruction, restricts output of both confidential data and non-confidential data from the special image processing apparatus when an unpermitted user gives instructions, and permits output of both confidential data and non-confidential data from special image processing apparatus when a permitted user gives an instruction; and the server releases registration of the special image processing apparatus when at least a predetermined time has elapsed after the special image processing apparatus is used, and output of image data, except confidential data, from the released image processing apparatus is enabled for all users, wherein, when at least a predetermined time has elapsed after the special image processing apparatus is used, the server releases registration of the special image processing apparatus and allows output of image data, except confidential data, from the released imaging processing apparatus, and when the predetermined period has not elapsed, restricting output from the special image processing apparatus by the unpermitted user and outputting the image data for a permitted user.

* * * * *